United States Patent [19]
O'Rourke

[11] Patent Number: 5,906,735
[45] Date of Patent: May 25, 1999

[54] BEVERAGE-SCREENING FILTER LEAF HAVING WOVEN SCREEN SUPPORTED AGAINST DEFLECTION

[76] Inventor: Sheldon G. O'Rourke, 24 Windswept Dr., Arnold, Mo. 63010

[21] Appl. No.: 08/844,868

[22] Filed: Apr. 22, 1997

Related U.S. Application Data

[60] Provisional application No. 60/016,878, May 6, 1996.

[51] Int. Cl.[6] .................................................. B01D 29/39
[52] U.S. Cl. .......................... 210/232; 210/346; 210/486
[58] Field of Search .......................... 20/232, 322, 323.1, 20/346, 486, 487, 488, 489

[56] References Cited

U.S. PATENT DOCUMENTS

| | | |
|---|---|---|
| 2,964,194 | 12/1960 | Oliver, Jr. et al. . |
| 3,486,627 | 12/1969 | Ashby et al. . |
| 3,499,535 | 3/1970 | Zievers et al. . |
| 3,542,205 | 11/1970 | O'Cheskey . |
| 3,623,614 | 11/1971 | Schmidt, Jr. . |
| 3,756,417 | 9/1973 | MacQuilkin et al. . |
| 4,077,887 | 3/1978 | Langvik ................................... 210/486 |
| 4,179,378 | 12/1979 | Borre ....................................... 210/232 |
| 4,330,405 | 5/1982 | Davis et al. ............................. 210/486 |
| 4,776,958 | 10/1988 | Stephenson ............................. 210/193 |
| 4,790,935 | 12/1988 | Johnson .................................. 210/232 |
| 4,863,656 | 9/1989 | Hindstrom ............................... 210/331 |
| 4,865,732 | 9/1989 | Garrant et al. .......................... 210/232 |
| 4,964,987 | 10/1990 | Johnson .................................. 210/332 |
| 5,076,924 | 12/1991 | Persson et al. ......................... 210/489 |
| 5,360,541 | 11/1994 | Gerakios ................................. 210/232 |
| 5,635,062 | 6/1997 | Cameron et al. ....................... 210/232 |

*Primary Examiner*—David A. Reifsnyder
*Attorney, Agent, or Firm*—Armstrong Teasdale LLP

[57] ABSTRACT

A leaf filter for filtering solid particles from a liquid in a pressure tank. The leaf filter has a frame with a perimeter adapted to fit within the pressure tank. A flange with a groove in its outer surface, projects planar around the outer perimeter of the frame. The leaf filter has a filtering element with a perimeter that is larger than the perimeter of the frame. A cord is adapted to compressably engage the flange groove. The cord secures the outer edge of the filtering element to the groove thereby holding the filtering element planar and taut on the frame.

32 Claims, 2 Drawing Sheets

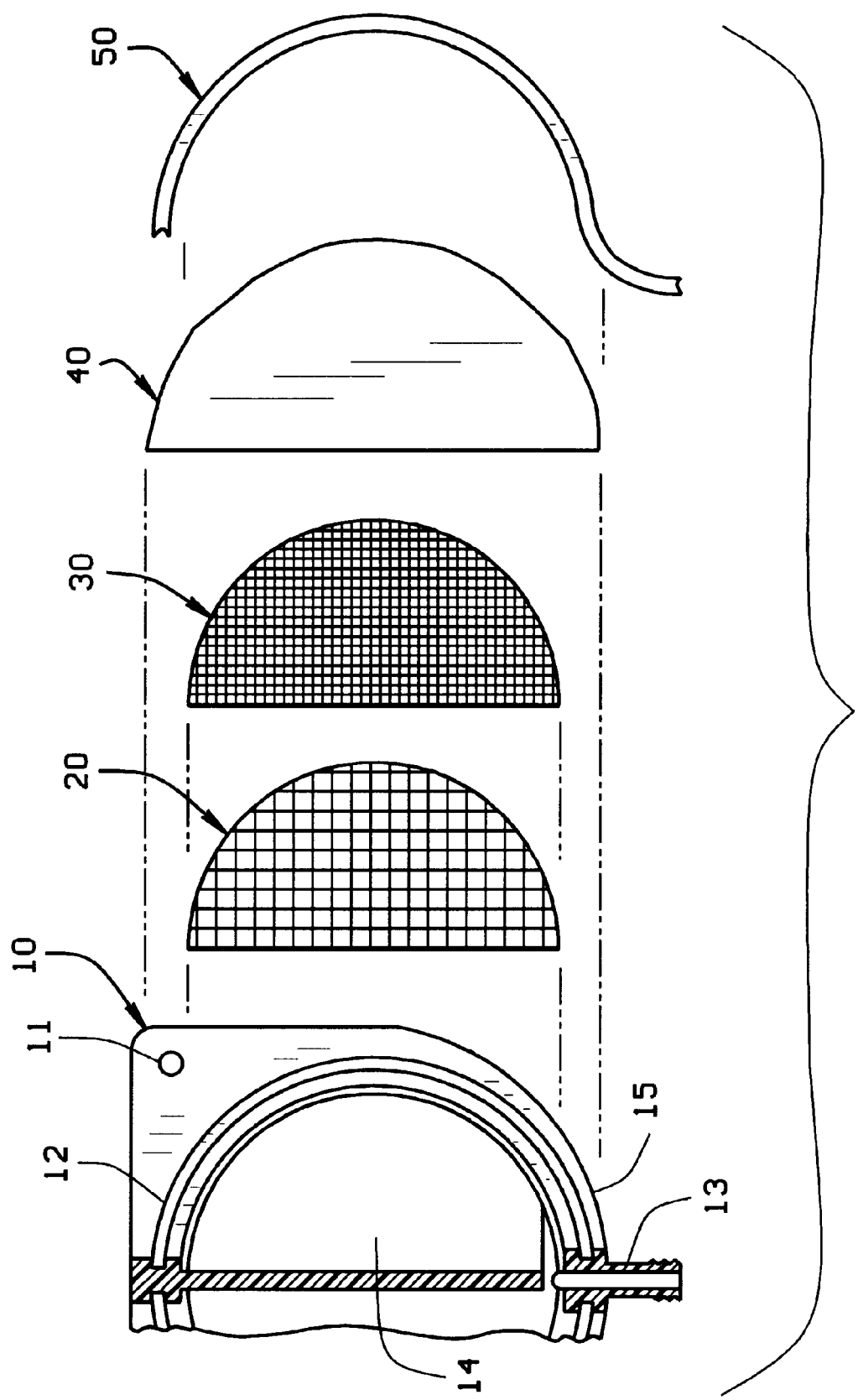

BEVERAGE-SCREENING FILTER LEAF HAVING WOVEN SCREEN SUPPORTED AGAINST DEFLECTION

This application claims the benefit of U.S. Provisional Application No. 60/016,878 filed May 6, 1996.

FIELD OF THE INVENTION

This invention relates to pressure leaf filters of the type conventionally assembled in arrays in pressure tanks and used, with a covering of diatomaceous earth, to separate particulate matter from liquids such as beverages, chemical preparations, and the like; and particularly to the use in such filter of a woven mesh screen supported against out-of-plane deflection due to flow-through of the liquid.

BACKGROUND OF THE INVENTION

Pressure leaf filters are well known for use, for example, in the beverage industry to eliminate tiny particles of matter. The liquid to be filtered is introduced, under substantial pressure, into large pressure tanks containing multiple filter leaf elements. The pressure drives the liquid from the exterior of the filter leaf elements to their interior, from which it flows through a common manifold to the exterior. Such filtering systems are available from numerous sources, such as the Duriron Company of Angola, New York. Filter leaf elements of varying design are available from sources as the Duriron Company of Albany, N.Y., as well as the Lenser Company of Germany.

At least two types of pressure leaf filter element constructions are known. One type, of welded stainless steel construction, includes a filtering screen through which liquid is pumped, the screen conventionally bearing a covering of diatomaceous earth. The filtering screen on the outer side of the leaf may be supported inwardly by a succession of coarser screens or perforated plates through which the screened liquid is drained. These leaf elements are typically costly, heavy, and not easily repaired if their filtering screens are damaged. Another known pressure filter leaf construction uses a fabric bag loosely enclosing a polypropylene element molded with parallel grooves perforated to lead to a hollow interior from which the liquid, screened by the fabric of the bag, is drained through a common outlet. As a disadvantage, if the bag is loose, inflow pressure may press the weave into the groove of the plastic leaf element, whereas if the bag is tight, the weave may be distorted enlargingly in either case defeating its intended function as a precise screen.

SUMMARY OF THE INVENTION

The present invention is a molded and fabricated plastic pressure leaf filter element which substitutes for heretofore-available elements in size, shape, function and manners of use. Its screening element is inexpensive and easily replaceable (especially when compared with welded metal leaf screens). It will be found to function at least as effectively as the metal screens, and without the aforementioned problems associated with the use of fabric bags.

The present leaf frame is of such size and shape to fit, side-by-side, within the pressure tank, which may be of a chosen depth, for example, four feet. Its strength resides largely in its central, integrally molded panel. At each side, its rim has novel means for mounting a fine-mesh filtering screen stretched thereacross, preferably of any durable synthetic plastic cloth, but even of cloth-like metal sufficiently deformable for attaching as hereafter described.

A preferred means for attaching the filtering screens across the rim surface comprises inserting such deformable screen into the circumferential groove in each rim face, and pressing over its edge so inserted a radially-inward compressed rubber cord to hold the screen planar and taut.

To support the filtering screens against out-of-plane deflection due to the inflow pressure, the frame is filled, between its filtering screens, by conventional plastic three-dimensional lattice-like flow-permitting spacing members. Those lattice-like members immediately adjacent to the filtering mesh are preferably relatively fine, and are supported by a coarser lattice structure adjacent to the central panel. Such lattice members facilitate outflow through a bottom central outlet, the panel stopping short.

BRIEF DESCRIPTION OF THE DRAWINGS

FIG. 2 is an exploded view of one half of the leaf element of FIG. 1 showing halves of its molded central panel and of the members fitted thereon.

DESCRIPTION OF THE PREFERRED EMBODIMENT

Figure 1:
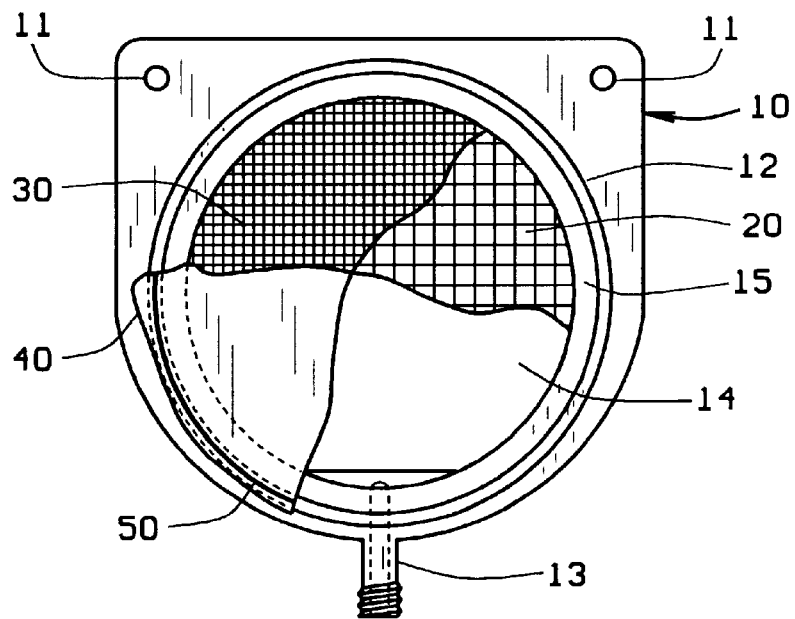
FIG. 1 is a plan view of an assembled filter leaf with all elements except its molded plastic frame partially broken away to show its molded central divider panel.

The present invention will be readily understood by those persons familiar with leaf filters as conventionally installed in pressure tanks and drained through a common piping manifold. Each filter leaf has a frame 10, which may be as much as five feet deep, being shaped to fit within a pressure tank of chosen design and suspended by their upper corner bores 11 as part of a parallel-aligned battery of such suspended leaves. The leaf frames are molded of a strong plastic material inert to the liquid to be screened.

A strong rigid construction is afforded in the illustrated construction, by a sturdy integral central dividing plate 14 which terminates above a common drainage outlet 13.

On each side of the central dividing plate 14, the frame has a projecting preferably planar rim or flange 15 around its perimeter. In the preferred embodiment of the invention, a substantially square-cut groove 12 is molded into the outside surface of the flange 15. The groove 12, together with an elastic rubber cord 50 whose diameter must be compressed to fit within the groove 12, tautly secures the outer edge of a filtering element 40 to be described. This mounting system permits the filtering element 40 to be easily replaced. It is understood that for typical applications the screen is coated with fuller's earth or diatomaceous earth.

Recommended as such a screen is the plastic cloth material woven of nylon, polypropylene, or polyethylene, as obtainable from Tetko, Inc., Briarcliff Manor, N.Y.; instead a very fine flexible mesh metal screen may be employed.

Figure 3:
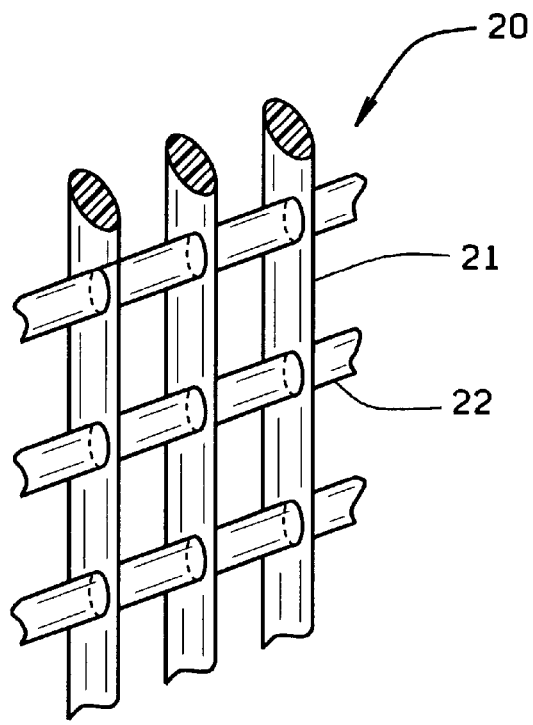
FIG. 3 is a fragmentary view of a coarser spacing lattice portion, illustrating how its vertical spacing members, being substantially larger than its horizontal members, readily conduct flow downward to the leaf's flow outlet.

Because of the relatively high pressure within the filter tank which drives the liquid through the woven screen, inward flexure would be likely to impermissably enlarge its mesh. To avoid such out-of-plane distortion, plastic lattice-like spacing members 20 and 30 (not drawn to scale) are utilized whose combined thickness equals the depth of the rim 15 above the central dividing plate 14. Sheets of such lattice-like plastic material are obtainable from Internet, Inc. of Minneapolis, Minn. 55427. It is preferred to utilize the combined spacing-thickness of two such spacing members, the outer of these, designated 30, having such smaller lattice spacing as prevents the inflow pressure from significant distortion of the mesh; while the larger lattice number 20 serves to support the smaller and permits easy downflow to the panel outlet 13. Thus, as shown in FIG. 3, the vertical members 21 of the coarser lattice 20 may project farther inward than its horizontal members 22, thus facilitating drainage. The frame's common drainage outlet 13 receives flow from both sides of the panel 14, which stops short of the outlet.

In a modified embodiment, should the frame 10 be made strong enough to serve without the dividing plate 14, a single heavy lattice (not illustrated) may fill the entire spacing between the two fine lattices 30 which support the two filtering elements 40 on opposite sides of the frame.

For performing the functions of the several means and portions herein described, other means may be substituted, the essence of the invention being to so support tightly-stretched mesh screens that the mesh cannot be distortingly enlarged by deflecting inwardly under the pressurized flow into the leaf.

As various modifications may be made in the constructions herein described and illustrated without departing from the scope of the invention, it is intended that all matter contained in the foregoing description or shown in the accompanying drawings shall be taken as illustrative rather than limiting.

I claim:

1. A leaf filter for filtering solid particles from a liquid in a pressure tank, the leaf filter comprising:

a frame having a perimeter adapted to fit within the pressure tank, the frame having a drainage outlet along its central plane at its lower edge, whereby liquid inflow from opposite sides of the frame is discharged through the drainage outlet;

a rim having a groove in its two outer surfaces the rim projecting planar around the perimeter of the frame;

filtering elements having outer edges, each filter element configured to mount to the frame;

cords adapted to compressably engage the grooves, whereby the cord secures the outer edges of the filtering elements to the grooves thereby holding the filtering elements planar and taught on the frame; and lattice spacing members adjacent and interposed between the filtering elements, the lattice spacing members comprising a course lattice spacing member interposed between two fine lattice spacing members.

2. The leaf filter of claim 1 wherein the frame has a drain outlet along its central plane at its lower edge, whereby liquid inflow from the opposite sides of the frame is discharged through the drain outlet.

3. The leaf filter of claim 2 further comprising a central dividing plate for reinforcing the frame, the central dividing plate adapted to fit within the frame above the drain outlet along the central plane of the frame.

4. The leaf filter of claim 3 wherein the frame further comprises lattice spacing members adjacent the filtering element.

5. The leaf filter of claim 4 wherein the combined thickness of the lattice spacing members is substantially the same as the depth of the rim above the central dividing plate.

6. The leaf filter of claim 4 wherein the lattice spacing members comprise first lattice members immediately adjacent the filtering element and second lattice members immediately adjacent the central dividing plate, wherein first lattice members comprise a smaller spaced lattice and second lattice members comprise a larger spaced lattice.

7. The leaf filter of claim 6 wherein the second lattice members comprise horizontal members and vertical members which form a criss-cross pattern.

8. The leaf filter of claim 7 wherein the vertical members project farther inwardly toward the central dividing plate than the horizontal members to facilitate drainage into the drain outlet.

9. The leaf filter of claim 1 wherein the frame further comprises upper corner bores for suspending the frame within the pressure tank.

10. The leaf filter of claim 1 wherein the frame is plastic.

11. The leaf filter of claim 10 wherein the plastic is inert to the liquid to be filtered.

12. The leaf filter of claim 1 wherein the groove is substantially square-cut.

13. The leaf filter of claim 1 wherein the groove is molded into the outer surface of the rim.

14. The leaf filter of claim 1 wherein the cord is elastic rubber.

15. The leaf filter of claim 1 wherein the cord has a diameter that is larger than the width of the groove, whereby the cord compresses to engage the groove.

16. The leaf filter of claim 1 wherein the filtering element is coated with diatomaceous earth.

17. The leaf filter of claim 1 wherein the filtering element is plastic cloth material.

18. The leaf filter of claim 1 wherein the filtering element is fine flexible mesh metal.

19. A leaf filter for filtering solid particles from a liquid in a pressure tank, the leaf filter comprising:

a frame having a perimeter adapted to fit within the pressure tank, the frame having a drainage outlet along its central plane at its lower edge, whereby liquid inflow from opposite sides of the frame is discharged through the drainage outlet;

filtering elements supported by the frame, the filtering elements configured to mount to the frame;

a central support dividing plate shaped to fit within the frame along its central plane above the drainage outlet, wherein the central dividing plate reinforeces the frame and is interposed between the filtering elements;

a rim projecting planar around the frame perimeter, the rim having grooves in its two outer surfaces;

compressible cords adapted to fit within the grooves; whereby the filtering elements are inserted into the grooves and the cords compress to securely engage the filtering elements in the grooves thereby holding the filtering elements planar and taut within the frame; and lattice spacing members adjacent the filtering elements and interposed between the central support panel and each filtering element, the lattice spacing members comprise first lattice members immediately adjacent the filtering elements and second lattice members immediately adjacent the central support panel wherein the first lattice members comprise a smaller spaced lattice and the second lattice members comprise a larger spaced lattice.

20. The leaf filter of claim 19 wherein the frame further comprises corner bores in each of its upper corners for suspending the filter within the pressure tank.

21. The leaf filter of claim 19 wherein the frame is molded plastic.

22. The leaf filter of claim 21 wherein the plastic is inert to the liquid to be filtered.

23. The leaf filter of claim 19 wherein the grooves are substantially square-cut.

24. The leaf filter of claim 19 wherein the grooves are molded into the outer surfaces of the rim.

25. The leaf filter of claim 19 wherein the compressible cord is elastic rubber.

26. The leaf filter of claim 19 wherein the cord has a diameter that is larger than the width of the groove.

27. The leaf filter of claim 19 wherein the filtering elements are coated with diatomaceous earth.

28. The leaf filter of claim 19 wherein the filtering element is plastic cloth material.

29. The leaf filter of claim 19 wherein the filtering element is fine flexible mesh metal.

30. The leaf filter of claim 19 wherein the combined thickness of the lattice spacing members is substantially the same as the depth of the rim above the central dividing plate.

31. The leaf filter of claim 19 wherein the second lattice members comprise horizontal members and vertical members which form a criss-cross pattern.

32. The leaf filter of claim 31 wherein the vertical members project farther inwardly toward the central dividing plate than the horizontal members to facilitate drainage into the drain outlet.

* * * * *